(12) United States Patent
Young et al.

(10) Patent No.: US 11,991,207 B2
(45) Date of Patent: *May 21, 2024

(54) ANTI-PHISH, PERSONALIZED, SECURITY TOKEN FOR USE WITH ELECTRONIC COMMUNICATIONS

(71) Applicant: Bank of America Corporation, Charlotte, NC (US)

(72) Inventors: Michael Young, Davidson, NC (US); Vinesh Patel, London (GB); Melissa Gordon Glenn, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 284 days.

This patent is subject to a terminal disclaimer.

(21) Appl. No.: 17/693,506

(22) Filed: Mar. 14, 2022

(65) Prior Publication Data

US 2023/0291765 A1 Sep. 14, 2023

(51) Int. Cl.
*H04L 9/40* (2022.01)

(52) U.S. Cl.
CPC ............................... *H04L 63/1483* (2013.01)

(58) Field of Classification Search
CPC .................................................. H04L 63/1483
USPC .................................................................. 726/22
See application file for complete search history.

(56) References Cited

U.S. PATENT DOCUMENTS

| | | | |
|---|---|---|---|
| 6,965,919 B1 | 11/2005 | Woods et al. | |
| 7,290,035 B2 | 10/2007 | Mattathil | |
| 7,802,298 B1 | 9/2010 | Hong et al. | |
| 7,841,003 B1 | 11/2010 | Emdee | |
| 8,949,978 B1 * | 2/2015 | Lin | H04L 63/123 726/25 |
| 10,366,373 B1 * | 7/2019 | Denker | G06Q 20/047 |
| 10,609,072 B1 * | 3/2020 | Weldon | H04L 67/02 |
| 10,931,709 B2 | 2/2021 | Parekh | |

(Continued)

OTHER PUBLICATIONS

"USAA Suspicious Emails," https://www.usaa.com/inet/wc/security_strange_email#:~:text=Cybercriminals%20may0%20try%20and%20trick.to%20every%20email%20we%20send, USAA, Retrieved on Jan. 24, 2022.

(Continued)

*Primary Examiner* — Thanh T Le
(74) *Attorney, Agent, or Firm* — Weiss & Arons LLP

(57) ABSTRACT

Methods for securing an electronic communication is provided. Methods may include, in a registration process, creating and/or selecting an anti-phish, personalized, security token for a predetermined account. Methods may include, in the registration process, storing the token in a database. Methods may include, in an in-use process, generating an electronic communication at a channel. The database may be interposed along the channel. Methods may include, in the in-use process, forwarding the communication to a recipient. The recipient may be associated with the account. Methods may include, in the in-use process, intercepting the communication at the database. Methods may include, in the in-use process, selecting, from the database, the anti-phish, personalized, security token that is associated with the account. Methods may include, in the in-use process, injecting the selected token into the communication. Methods may include, in the in-use process, transmitting the communication with the token to the recipient.

6 Claims, 6 Drawing Sheets

(56) References Cited

U.S. PATENT DOCUMENTS

| | | | |
|---|---|---|---|
| 11,055,394 B2* | 7/2021 | Norris, III | G06F 21/36 |
| 11,381,598 B2 | 7/2022 | Nunes et al. | |
| 11,546,377 B2 | 1/2023 | Boshmaf et al. | |
| 11,785,004 B2* | 10/2023 | Soon-Shiong | G16B 50/00 |
| 11,882,112 B2 | 1/2024 | Keiter et al. | |
| 2007/0074119 A1* | 3/2007 | Komine | G06F 21/36 |
| | | | 715/743 |
| 2008/0034428 A1* | 2/2008 | Bejar | H04L 63/126 |
| | | | 726/23 |
| 2008/0046968 A1* | 2/2008 | Cline | H04L 63/1483 |
| | | | 726/2 |
| 2009/0292025 A1 | 11/2009 | Braude et al. | |
| 2009/0292925 A1* | 11/2009 | Meisel | H04L 63/0876 |
| | | | 713/176 |
| 2010/0031022 A1* | 2/2010 | Kramer | H04L 63/1483 |
| | | | 726/3 |
| 2013/0139238 A1* | 5/2013 | Ryan | G06F 21/55 |
| | | | 726/7 |
| 2014/0137192 A1* | 5/2014 | Arroyo-Figueroa | H04L 63/08 |
| | | | 726/3 |
| 2014/0181216 A1* | 6/2014 | Liebmann | H04L 51/08 |
| | | | 709/206 |
| 2016/0182418 A1* | 6/2016 | Gupta | H04L 63/08 |
| | | | 709/206 |
| 2017/0230416 A1* | 8/2017 | Sabarish | H04L 63/0807 |
| 2020/0259772 A1* | 8/2020 | Dubie | H04L 51/212 |
| 2020/0358798 A1* | 11/2020 | Maylor | H04L 63/1433 |
| 2021/0211462 A1 | 7/2021 | Birch et al. | |
| 2021/0218736 A1* | 7/2021 | Kumar | H04L 63/1483 |
| 2022/0070215 A1 | 3/2022 | Stolfo et al. | |
| 2022/0116420 A1 | 4/2022 | Weber et al. | |
| 2022/0318233 A1* | 10/2022 | Martinez | H04L 9/50 |
| 2022/0318938 A1* | 10/2022 | Ogawa | G06Q 50/184 |
| 2022/0385648 A1* | 12/2022 | Keiter | H04L 63/083 |
| 2022/0385693 A1* | 12/2022 | Keiter | H04L 63/306 |
| 2023/0086249 A1* | 3/2023 | Albero | H04L 51/212 |
| | | | 726/9 |
| 2023/0319029 A1 | 10/2023 | Young et al. | |

OTHER PUBLICATIONS

"What Is an Email Header?—Guide," https://sendpulse.com/support/glossary/email-beader. SendPulse, Retrieved on Mar. 21, 2022.

"What Is an Email Header?" https://whatismyipaddress.com/email-header, CGP Holdings, Inc., Retrieved on Mar. 21, 2022.

* cited by examiner

ANTI-PHISH, PERSONALIZED, SECURITY TOKEN FOR USE WITH ELECTRONIC COMMUNICATIONS

FIELD OF TECHNOLOGY

Aspects of the disclosure relate to electronic communication security.

BACKGROUND OF THE DISCLOSURE

In recent years, the quantity of electronic communications has superseded non-electronic communications. Electronic communications involve an assortment of information exchange. Such information exchange includes both sensitive information, such as bank account data, and non-sensitive information, such as daily international news.

Because of the profitability associated with malicious capture of sensitive information, those of malicious intent have created various techniques for deceptively obtaining sensitive information. One of the deceptive techniques may include phishing.

Phishing software is a category of malware in which an imitation electronic communication is sent to a recipient. The electronic communication may impersonate a legitimate entity, organization or individual. The electronic communication may appear to have been transmitted by the impersonated entity, organization or individual. The electronic communication may include an information request, a funds request, a download request or any other malicious actionable.

Many times, phishing communications are transmitted as mass campaigns. For example, a malicious entity may harvest a plurality of emails addresses from a plurality of sources, including websites. The malicious entity may transmit a mass, non-targeted, email campaign that impersonates a financial institution. The email may include a request to click on a link to recertify a know your customer ("KYC") criteria. Once selected, the link may direct a user to a malicious webpage that replicates the look and feel of a financial institution. The malicious webpage may capture sensitive information relating to the unsuspecting user.

Because of the proliferation of malicious phishing communications, many users are weary of, and often frustrated with, entering information into and/or selecting links that are found within even legitimate electronic communications. Therefore, many legitimate electronic communications do not receive responses because the receivers are weary of phishing communications.

Therefore, it would be desirable for electronic communications originating from legitimate entities to be self-authenticating. As such, an anti-phish, personalized, security token may be injected into each electronic communication originating from a legitimate entity. The anti-phish, personalized, security token may increase the confidence of the receiving entity regarding the validity of the electronic communication.

SUMMARY OF THE DISCLOSURE

Apparatus and methods for securing electronic communications is provided. Methods may include a registration process, in which a user registers for anti-phish token. Methods may include an in-use process, in which an enterprise generates electronic communications, injects the electronic communications with an anti-phish token for each recipient and transmits the electronic communications to one or more recipients.

During the registration process, methods may include receiving a request from one or more users to receive an anti-phish, personalized, security token with each electronic communication received in one or more of a plurality of channels. The plurality of channels may include email communications, short messaging service ("SMS") communications and instant messaging service ("IMS") communications.

During the registration process, methods may include presenting, to each of the one or more users, a plurality of selectable options for the anti-phish, personalized, security token. The plurality of selectable options may include a numeric code, a photograph, a plurality of photographs, an animation, a plurality of animations and/or any suitable combination of the above-stated options. The plurality of selectable options may be associated with a theme. The plurality of selectable options may enable a user to upload one or more photographs and/or one or more animations.

The plurality of selectable options may include a dynamically-rotating digital artwork file linked to a non-fungible token ("NFT"). The dynamically-rotating file may rotate on a predetermined schedule and/or randomly.

In some embodiments, a user may select a different option for each channel. As such SMSs may be received with a first anti-phish token, IMSs may be received with a second anti-phish token and emails may be received with yet a third token.

The presentation of the selectable options may be executed on a mobile device displaying a webpage. The webpage may be associated with the enterprise.

During the registration process, methods may include receiving from the one or more users a selection of an option, included in the plurality of selectable options.

During the registration process, methods may include registering the selected option with each of the one or more users. The registering may include storing the anti-phish, personalized, security token in a database. The database may be coupled to an interceptor computer system. The database coupled to the interceptor computer system may be interposed along the one or more channels.

The database coupled to an interceptor computer system may be included in a plurality of databases. The plurality of databases may be coupled to the interceptor computer system. The registering may include storing the anti-phish, personalized, security token in a database included in the plurality of databases. The database may be related to the channel that is associated with the anti-phish, personalized, security token.

There may be an in-use process. The in-use process may involve an enterprise communicating with a user. During the in-use process, methods may include generating one or more electronic communications at one or more of the plurality of channels.

During the in-use process, methods may include generating one or more electronic communications at one or more of the plurality of channels.

During the in-use process, methods may include forwarding the one or more electronic communications to the one or more recipients. The forwarding may be via the one or more channels.

During the in-use process, methods may include intercepting the one or more electronic communications at the database coupled to the interceptor computer system.

During the in-use process, methods may include, for each of the one or more electronic communications, selecting from the database coupled to the interceptor computer system, the anti-phish, personalized, security token.

During the in-use process, methods may include for each of the one or more electronic communications, injecting the anti-phish, personalized, security token into the electronic communication. During the in-use process, methods may include for each of the one or more electronic communications, transmitting the electronic communication with the injected anti-phish, personalized, security token to the recipient.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
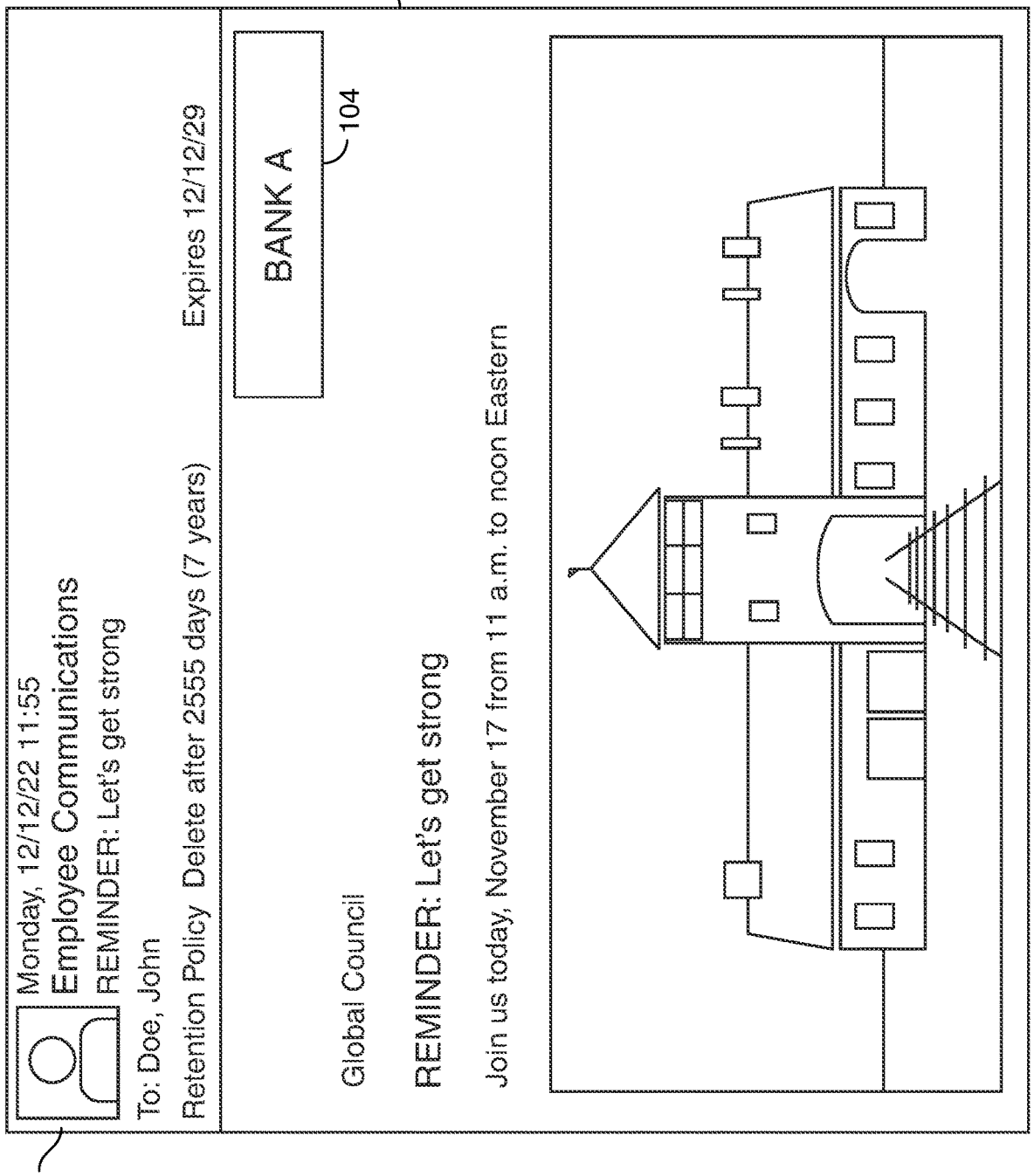
FIG. 1 shows an illustrative diagram in accordance with principles of the disclosure.

Apparatus and methods for securing electronic communications is provided. The system may include an originating server, an edge server and a database. The originating server, edge server and database may be located at an entity.

During a registration process, the originating server may receive a request from a user. The request may be to receive an anti-phish, personalized, security token with each electronic communication from the entity.

During the registration process, the originating server may display a plurality of selectable options for the anti-phish, personalized, security token. The originating server may receive a selection of an option for the anti-phish personalized, security token. The option may be included in the plurality of selectable options.

Additionally, the originating server may enable the user to direct the originating server to create anti-phish, personalized, security token for the user. Creation of such a token may involve a machine learning module at the originating server.

During the registration process, the originating server may register the selected option as being linked to a profile associated with the user.

During the registration process, the originating server may store, in the database, the anti-phish, personalized, security token linked to the profile associated with the user.

During an in-use process, the originating server may generate an electronic communication. At least one recipient of the electronic communication may be the user.

During the in-use process, the originating server may forward the electronic communication to the recipient.

During the in-use process, the edge server may intercept the electronic communication. The edge server may retrieve the anti-phish, personalized, security token linked to the profile associated with the user. The edge server may populate the electronic communication with the anti-phish, personalized, security token. The edge server may forward the electronic communication to one or more electronic channels associated with the recipient.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows a prior art diagram. The prior art diagram shows electronic communication 102. Electronic communication 102 may have been transmitted from Bank A to John Doe.

The details of electronic communication 102 may be shown at 106. The details may include the date (Monday, Dec. 22, 2022 11:55), the entity and/or address from which electronic communication 102 was transmitted (Employee Communications), the subject (Reminder: Let's get strong), the recipient list (John Doe), the retention policy (Delete after 2555 days (7 Years)) and the expiration date (Dec. 12, 2029).

The body of electronic communication 102 may include text, drawings and any other suitable details. The body of electronic communication 102 may also include logo 104. Logo 104 may indicate the entity that transmitted electronic communication 102. Logo 104 may indicate the affinity of electronic communication 102. Electronic communication 102 may have been transmitted from an employee communications address associated with Bank A.

It should be appreciated that John Doe may receive electronic communication 102. John Doe may identify the sender of the email as Employee Communications at Bank A. John Doe may work for Bank A. However, because of the proliferation of phishing communications, John Doe may not want to click links, open attachments or provide information within electronic communication 102.

Figure 2:
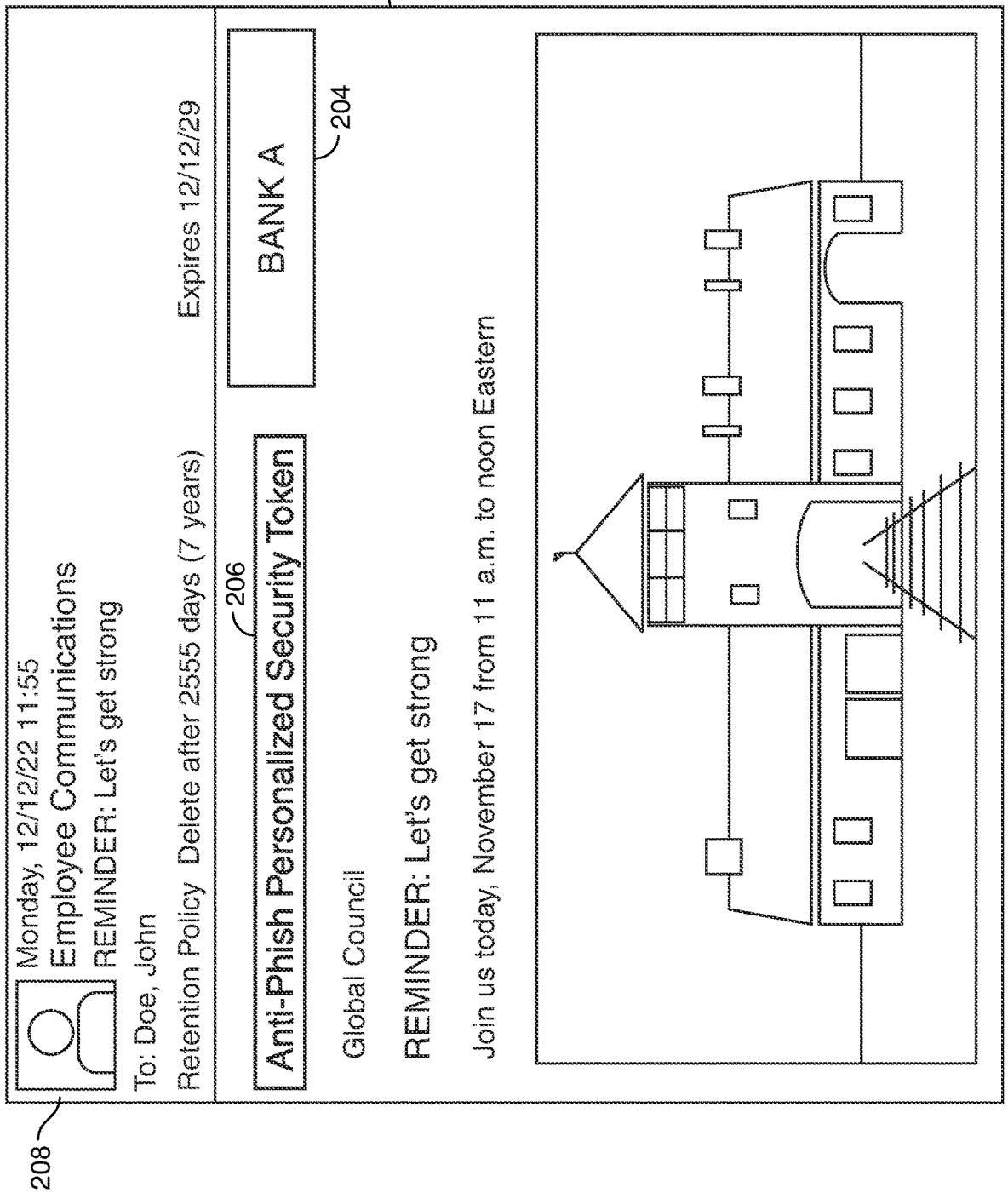
FIG. 2 shows another illustrative diagram in accordance with principles of the disclosure.

FIG. 2 shows an illustrative diagram. The illustrative diagram shows electronic communication 202. Electronic communication 202 may be an email. The details of electronic communication 202 may be shown at 208. The details may include the date (Monday, Dec. 12, 2022 11:55), the entity and/or address from which electronic communication 202 was transmitted (Employee Communications), the subject (Reminder: Let's get strong), the recipient list (John Doe), the retention policy (Delete after 2555 days (7 Years)) and the expiration date (Dec. 12, 2029).

The body of the electronic communication 202 may include text, drawings and any other suitable details. The body of electronic communication 202 may also include logo 204. Logo 204 may indicate the entity that transmitted electronic communication 202. Logo 204 may indicate the affinity of electronic communication 202. Electronic communication 202 may be transmitted from an employee communications address associated with Bank A.

Similar to electronic communication 102, shown in FIG. 1, John Doe may receive electronic communication 202. John Doe may identify the sender of the email as Employee Communications at Bank A. In order to achieve a level of confidence that the communication is indeed from Employee Communications at Bank A, John Doe may look for an anti-phish, personalized, security token embedded in electronic communication 202.

Anti-phish, personalized, security token may be shown at 206. Anti-phish, personalized, security token may be a dynamic and/or static, encrypted and/or non-encrypted, personalized electronic component that acts as a quick visual aid and indicates a level of confidence that the communication is indeed from an enterprise. The electronic component may be selected by the recipient of the communication, such as John Doe.

The electronic component may include one or more of the following, a numeric code, a photograph, an animation, a plurality of photographs, a plurality of animations any other suitable data element. The electronic component may dynamically select a photograph that relates to a pre-selected theme. As such, a communication recipient may select a theme, such as famous skyscrapers, and the token may retrieve a photograph or animation of a famous skyscraper from a plurality of photographs or from a network search, such as an Internet search. As such, the anti-phish, personalized, security token may appear different each time an electronic communication is transmitted from the transmitting entity to the recipient. For example, the anti-phish, personalized, security token may include a different photograph each time an electronic communication is transmitted from the transmitting entity to the recipient.

Even though a single electronic communication may be transmitted to multiple recipients, such as in a mass email campaign, the anti-phish, personalized, security token may be individual for each recipient. As such, after the electronic communication has been generated and transmitted, an intercepting server may inject the personalized token into each individual electronic communication.

Figure 3:
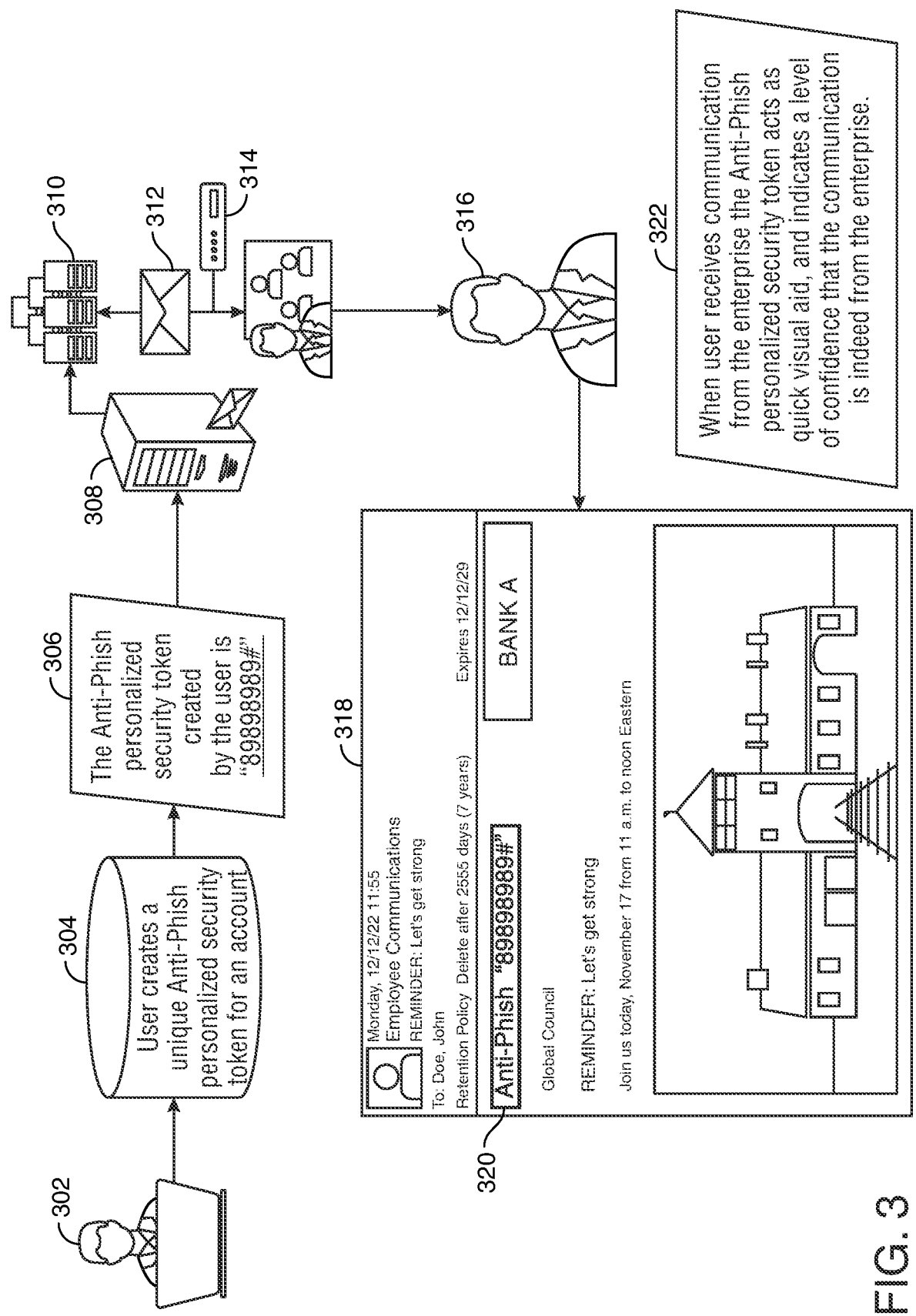
FIG. 3 shows an illustrative flow chart in accordance with principles of the disclosure.

FIG. 3 shows an illustrative diagram. User 302 may indicate a desire to utilize an anti-phish, personalized, security token in conjunction with electronic communications received from an entity. As such, user 302 may register for an anti-phish, personalized, security token. The registration may include creation of the anti-phish, personalized, security token, as shown at 304. The anti-phish, personalized, security token may be linked to, or associated with, an account of an entity. As such, the account may enable the user to interact with the entity.

The anti-phish, personalized, security token created by the user may be a numeric code, as shown at 306. The numeric code may include the following sequence 89898989 #. The numeric sequence may be stored at a server, such as software and/or hardware email server 308. Software and/or hardware email server 308 may be included in plurality of software and/or hardware email servers 310. One or more hardware processors may operate software and/or hardware email server 308 and software and/or hardware email servers 310.

An electronic communication, such as communication 312, may be generated at computing device 314 associated with the entity. Electronic communication 312 may be a communication directed to multiple recipients. Upon creation of electronic communication 312, each copy (specific to each recipient) of electronic communication 312 may communicate with servers 310. The communication between each copy of electronic communication 312 and servers 310 may be to retrieve the stored anti-phish token specific to each receiver of electronic communication 312. Servers 310 may respond with a null value in the event that the anti-phish token is not available. Examples of when the anti-phish token may not be available include a circumstance in which a user did not create the token or a circumstance in which the user did not register for the extra security associated with the token.

Once the specific anti-phish, personalized, security token has been retrieved, the anti-phish, personalized, security token may be injected into each copy of electronic communication 312. User 316 (which may be the same user as the user shown at 302), in addition to any other users, may receive electronic communication 312.

The details and body of electronic communication 312 may be shown at 318. It should be appreciated that the anti-phish, personalized, security token is shown at 320, included in electronic communication 312. When the user receives a communication from the enterprise, or entity, the anti-phish, personalized, security token acts as a quick visual aid, and indicates a level of confidence that the communication is indeed from the enterprise or entity, as shown at 322.

Figure 4:
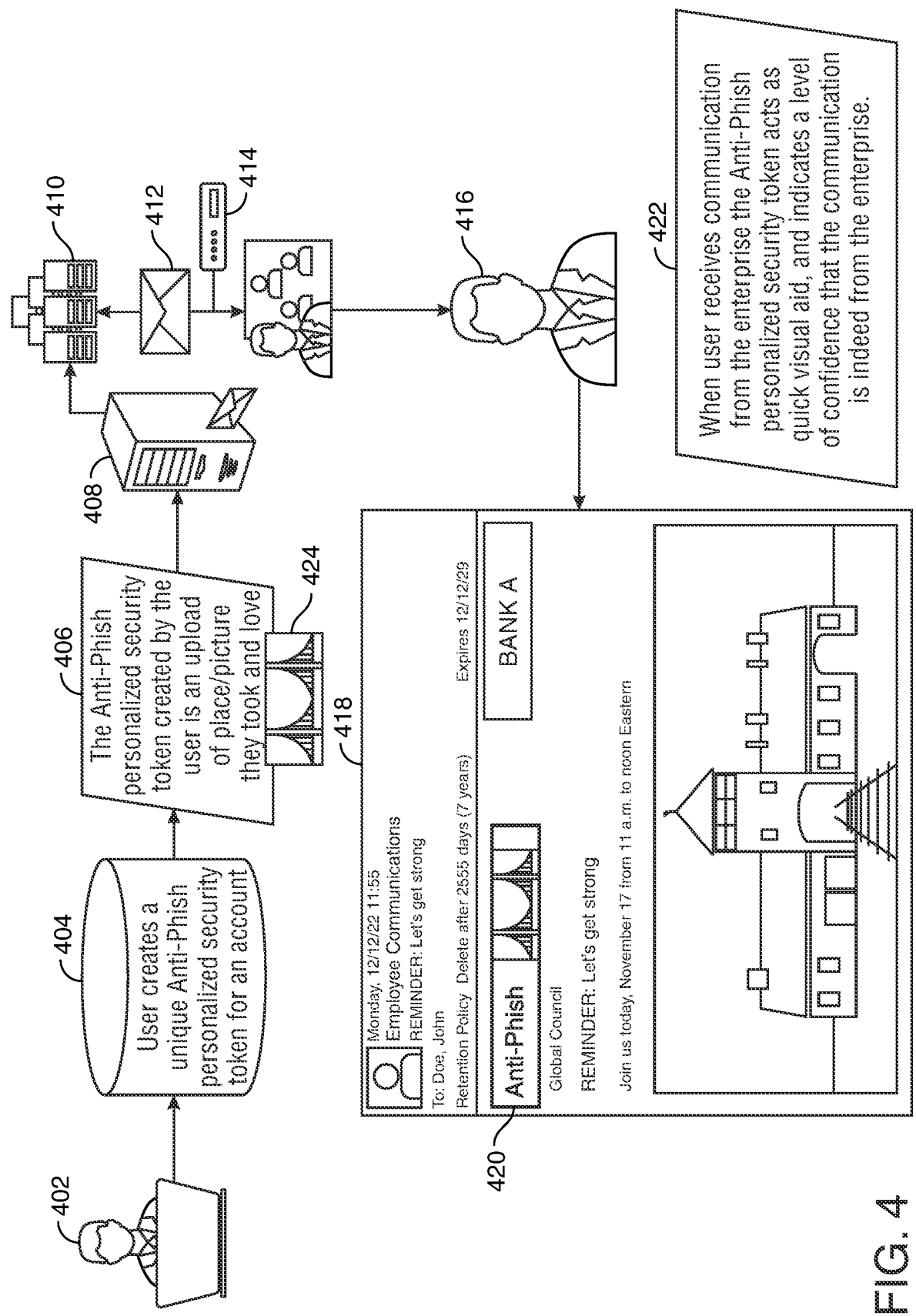
FIG. 4 shows another illustrative flow chart in accordance with principles of the disclosure.

FIG. 4 shows an illustrative diagram. User 402 may indicate a desire to utilize an anti-phish, personalized, security token in conjunction with electronic communications received from an entity. As such, user 402 may register for an anti-phish, personalized, security token. The registration may include creation of the anti-phish personalized security token, as shown at 404. The anti-phish, personalized, security token may be linked to, or associated with, an account of an entity. As such, the account may enable the user to interact with the entity.

The anti-phish, personalized, security token created by the user may be a photograph, as shown at 406. The photograph may have been uploaded by user 402. The photograph may be a picture taken by user 402. The photograph may be a picture of place, item or person for which user 402 has an affinity. The photograph may be stored at a server, such as software and/or hardware email server 408. Software and/or hardware email server 408 may be included in plurality of software and/or hardware email servers 410. One or more hardware processors may operate software and/or hardware email server 408 and software and/or hardware email servers 410.

An electronic communication, such as communication 412, may be generated at computing device 414 associated with the entity. Electronic communication 412 may be a communication directed to multiple recipients. Upon creation of electronic communication 412, each copy (specific to each recipient) of electronic communication 412 may communicate with servers 410. The communication between each copy of electronic communication 412 and servers 410 may be to retrieve the stored anti-phish token that is specific to each receiver of electronic communication 412. Servers 410 may respond with a null value in the event that the anti-phish token is not available. Examples of when the anti-phish token may not be available follow. One example of unavailability of an anti-phish token may be an event in which a user did not create the token or in the event that the user did not register for the extra security associated with the token.

Once the specific anti-phish, personalized, security token has been retrieved, the anti-phish, personalized, security token may be injected into each copy of electronic communication 412. User 416 (which may be the same user as the user shown at 402), in addition to any other users, may receive electronic communication 412.

The details and body of electronic communication 412 may be shown at 418. It should be appreciated that the anti-phish, personalized, security token is shown at 420, included in electronic communication 412. When the user receives a communication from the enterprise, or entity, the anti-phish, personalized, security token acts as a quick visual aid, and indicates a level of confidence that the communication is indeed from the enterprise or entity, as shown at 422.

Figure 5:
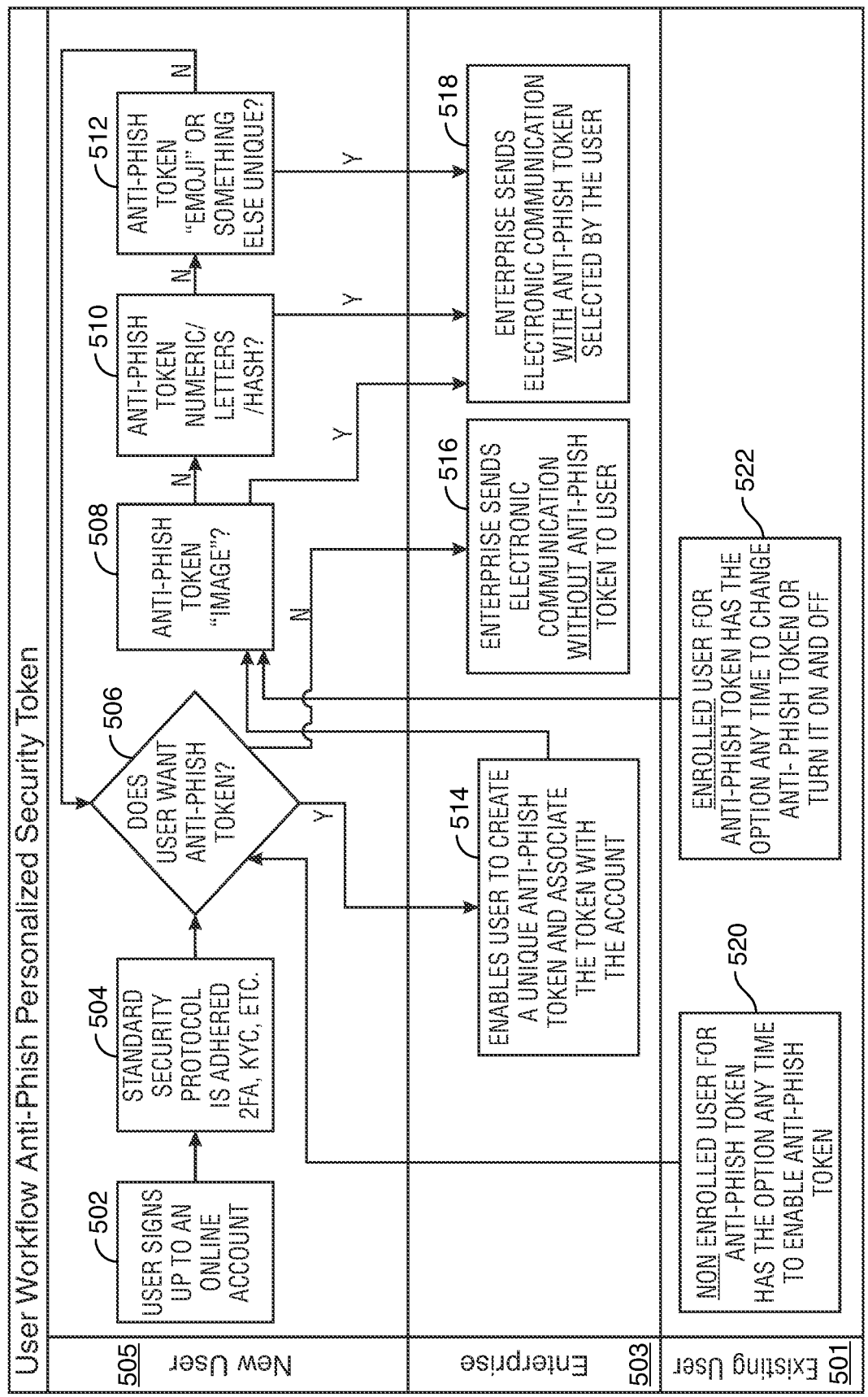
FIG. 5 shows yet another illustrative flow chart in accordance with principles of the disclosure.

FIG. 5 shows an illustrative flow chart. The flow chart relates to a user workflow for an anti-phish, personalized, security token. There may be three swim lanes (or any other suitable number of swim lanes), a new user swim lane 505, an enterprise swim lane 503 and an existing user swim lane 501.

A new user may sign up for an online account, as shown at 502. The online account may be opened using a computing apparatus, such as mobile device or personal computer ("PC"). The computing apparatus may communicate with an enterprise server. The communication between the new user and the enterprise server may include the new user opening, and communicating with, an enterprise website. The online account may be any suitable account associated with an enterprise. Such an enterprise may be indicated by swim lane 503.

Standard security protocols may be adhered to when opening the account, as shown at 504. Such security protocols may include two-factor authentication ("2FA") and know your customer ("KYC") protocols.

The enterprise server may query the user whether the user wants an anti-phish token, as shown at 506. It should be noted that an existing user, that is not enrolled for an anti-phish token, may have the option to enable an anti-phish token at any time, as shown at 520.

In the event that a user does want an anti-phish token, enterprise 503 may enable the user to create a unique anti-phish token and associate the unique anti-phish token with the account, as shown at 514. The user may select an anti-phish token image, as shown at 508, an anti-phish token numeric, letters and/or hash, as shown at 510, and an anti-phish token emoji or any other unique item, as shown at 512. Enterprise 503 may also enable a user to invoke an anti-phish generation algorithm. Such an anti-phish generation algorithm may generate a numeric code and/or photograph that may be specific to the user. The numeric code and/or photograph may be based on historical internet searches and/or other suitable information.

Once the anti-phish token is selected, the enterprise may send electronic communications to the user with the anti-phish token selected by the user, as shown at 518.

In the event that the user does not want an anti-phish token associated with the account, the enterprise may send electronic communications to the user without the anti-phish token, as shown at 516. Additionally, a user that is enrolled in the anti-phish token security protocol may have the option to change the anti-phish token or turn it on or off at any time, as shown at 522.

Figure 6:
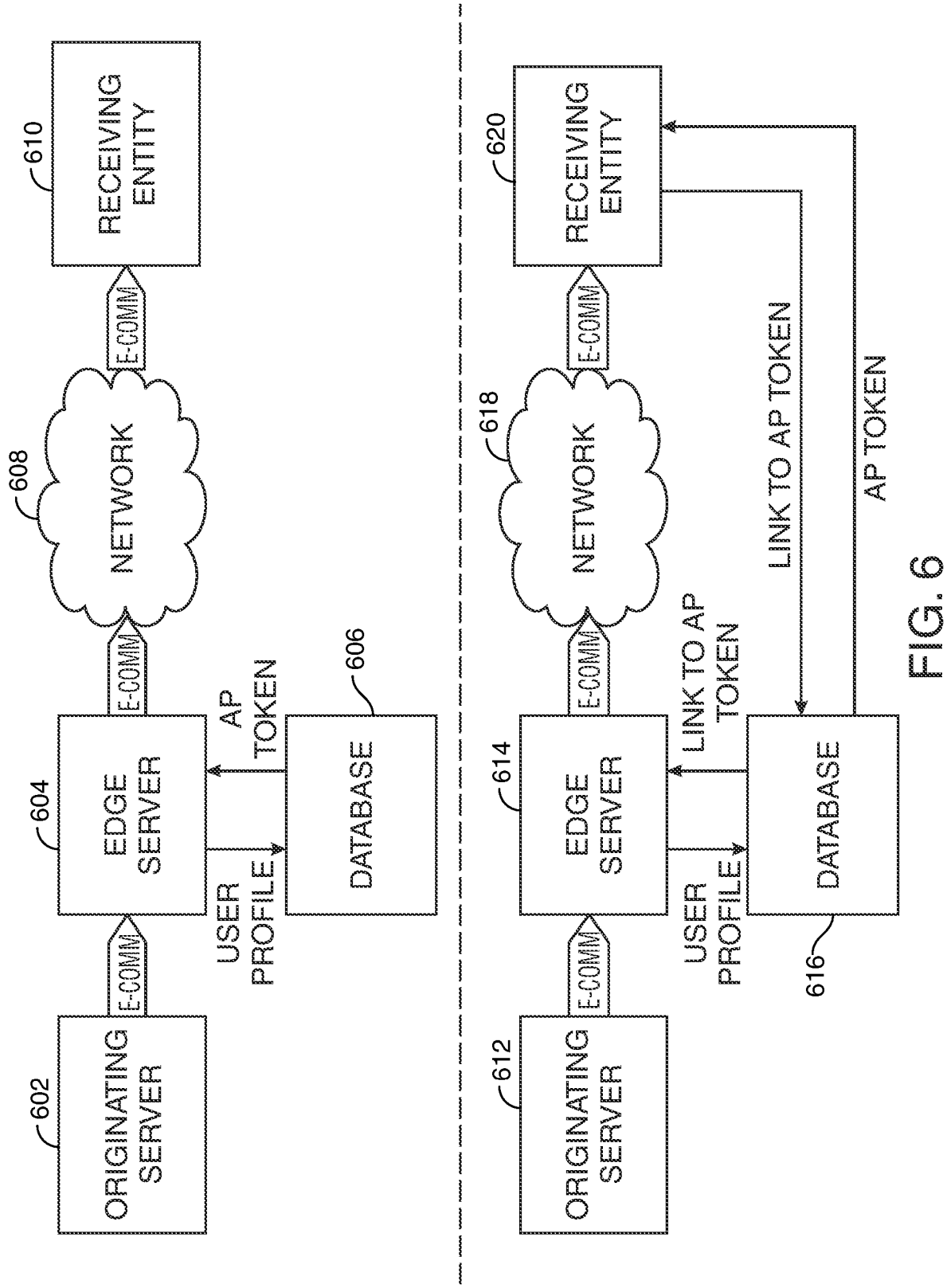
FIG. 6 shows an illustrative diagram in accordance with principles of the disclosure.

FIG. 6 shows an illustrative diagram. The illustrative diagram shows two implementations of a network environment that includes an anti-phish token.

In a first implementation, originating server 602 may generate an electronic communication, which may be shown in FIG. 6 as an e-comm. The electronic communication may be forwarded to edge server 604. The electronic communication may identify one or more recipients, also referred to as receiving entities.

For each identified recipient, edge server 604 may communicate a user profile to database 606. Database 606 may retrieve each anti-phish token associated with each receiving entity. Edge server 604 may inject each electronic communication with each retrieved anti-phish token.

Edge server 604 may transmit the electronic communications over network 608 to one or more receiving entities, such as receiving entity 610. The receiving entity may receive the electronic communication and be able to view the anti-phish token.

In a second implementation, originating server 612 may generate an electronic communication. The electronic communication may be forwarded to edge server 614. The electronic communication may identify one or more recipients, also referred to as receiving entities.

For each identified recipient, edge server 614 may communicate a user profile to database 616. Database 616 may retrieve a link for to an anti-phish token associated with each receiving entity. The link may access the anti-phish token within database 616, or any other suitable database or storage location. Edge server 614 may inject each electronic communication with each retrieved link. Edge server 614 may transmit the electronic communications over network 618 to receiving entity 620.

Each receiving entity, such as receiving entity 620 may receive the electronic communication with an embedded link. Once the electronic communication is received at receiving entity 620, the link may be activated, and the link may communicate with database 616.

Database 616 may validate the link. Once the link has been validated, the anti-phish token may be transmitted from database 616 to receiving entity 620. The anti-phish token may be populated into the electronic communication at receiving entity 620. The receiving entity may be able to view the anti-phish token with the received electronic communication.

Thus, an anti-phish, personalized, security token for use with electronic communications is provided. Persons skilled in the art will appreciate that the present invention can be practiced by other than the described embodiments, which are presented for purposes of illustration rather than of limitation. The present invention is limited only by the claims that follow.

What is claimed is:

1. A system for securing electronic communications, the system comprising:
    an originating server located at an entity;
    an edge server located at the entity;
    a database located at the entity;
    wherein during a registration process:
        the originating server receives a request from a user, the request to receive an anti-phish, personalized, security token with each electronic communication from the entity;

the originating server displays a plurality of selectable options for the anti-phish, personalized, security token, wherein the plurality of selectable options comprises:
  a numeric code, a photograph, a plurality of photographs, an animation, a plurality of animations and/or a combination of the numeric code, photograph, plurality of photographs, animation and plurality of animations; and
  a dynamically-rotating, digital-artwork file linked to a non-fungible token ("NFT"), said digital-artwork file that rotates on a predetermined schedule;
the originating server receives a selection of an option for the anti-phish, personalized, security token, the option included in the plurality of selectable options;
the originating server registers the selected option as being linked to a profile associated with the user; and
the originating server stores, in the database, the anti-phish, personalized, security token linked to the profile associated with the user;
wherein during an in-use process:
  the originating server generates an electronic communication, where a recipient of the electronic communication is the user;
  the originating server forwards the electronic communication to the recipient;
  the edge server intercepts the electronic communication;
  the edge server retrieves the anti-phish, personalized, security token linked to the profile associated with the user;
  the edge server populates the electronic communication with the anti-phish, personalized, security token; and
  the edge server forwards the electronic communication to one or more electronic channels associated with the recipient.

2. The system of claim 1, wherein the plurality of selectable options is associated with a theme.

3. The system of claim 1, wherein the plurality of selectable options enables the user to upload one or more photographs.

4. A system for securing electronic communications, the system comprising:
  an originating server located at an entity;
  an edge server located at the entity;
  a database located at the entity;
  wherein during a registration process:
    the originating server receives a request from a user, the request to receive an anti-phish, personalized, security token with each electronic communication from the entity;
    the originating server displays a plurality of selectable options for the anti-phish, personalized, security token, wherein the plurality of selectable options comprises:
      a numeric code, a photograph, a plurality of photographs, an animation, a plurality of animations and/or a combination of the numeric code, photograph, plurality of photographs, animation and plurality of animations; and
      dynamically-rotating digital artwork linked to a non-fungible token ("NFT") that rotates randomly;
    the originating server receives a selection of an option for the anti-phish, personalized, security token, the option included in the plurality of selectable options;
    the originating server registers the selected option as being linked to a profile associated with the user; and
    the originating server stores, in the database, the anti-phish, personalized, security token linked to the profile associated with the user;
  wherein during an in-use process:
    the originating server generates an electronic communication, where a recipient of the electronic communication is the user;
    the originating server forwards the electronic communication to the recipient;
    the edge server intercepts the electronic communication;
    the edge server retrieves the anti-phish, personalized, security token linked to the profile associated with the user;
    the edge server populates the electronic communication with the anti-phish, personalized, security token; and
    the edge server forwards the electronic communication to one or more electronic channels associated with the recipient.

5. The system of claim 4, wherein the plurality of selectable options enables the user to upload one or more photographs.

6. The system of claim 4, wherein the plurality of selectable options is associated with a theme.

* * * * *